United States Patent [19]
Baughmann

[11] 3,876,355
[45] Apr. 8, 1975

[54] PIPE INSULATING SYSTEM AND APPARATUS THEREFOR

[75] Inventor: Kenneth E. Baughmann, Houston, Tex.

[73] Assignee: B & B Insulation, Inc., Houston, Tex.

[22] Filed: Nov. 20, 1972

[21] Appl. No.: 308,151

[52] U.S. Cl. ............... 425/113; 425/329; 425/392; 425/455; 425/817 C
[51] Int. Cl. ............................................. B29f 3/10
[58] Field of Search......... 425/329, 4 C, 817 C, 371, 425/113, 392, 455, 377, 397, 115; 164/282; 198/165, 167

[56] References Cited
UNITED STATES PATENTS

| 2,187,253 | 1/1940 | Wallace | 425/397 X |
|---|---|---|---|
| 3,065,500 | 11/1962 | Berner | 425/4 C |
| 3,354,244 | 11/1967 | Davidson | 425/4 C X |
| 3,443,984 | 5/1969 | Stewart | 425/113 X |
| 3,496,596 | 2/1970 | Buff | 425/4 C |
| 3,566,448 | 3/1971 | Ernst | 425/4 C |
| 3,608,035 | 9/1971 | Frohlich | 425/113 X |
| 3,649,730 | 3/1972 | Benteler et al. | 425/4 C X |
| 3,733,382 | 5/1973 | Van Dijk | 425/103 X |

*Primary Examiner*—R. Spencer Annear
*Assistant Examiner*—Mark Rosenbaum
*Attorney, Agent, or Firm*—Hubbard, Thurman, Turner & Tucker

[57] ABSTRACT

A system is disclosed for insulating pipe with a foamed material, such as polyurethane, which includes an apparatus for forming a mold about the pipe into which the foam may be injected, apparatus for propelling the pipe through the mold, and support rollers for supporting the pipe before the foam sets without damaging or permanently deforming the foamed insulation. The molding apparatus may be a novel traveling mold in which mold forming members travel about and along the pipe at substantially the rate of movement of the pipe and a liner may be provided about the mold such as by a plastic film folding device. In the latter case, to aid in distribution of the foam about the pipe when injected, a barrier or dam means may be provided which is urged against the plastic film adjacent the area where foam is injected.

20 Claims, 14 Drawing Figures

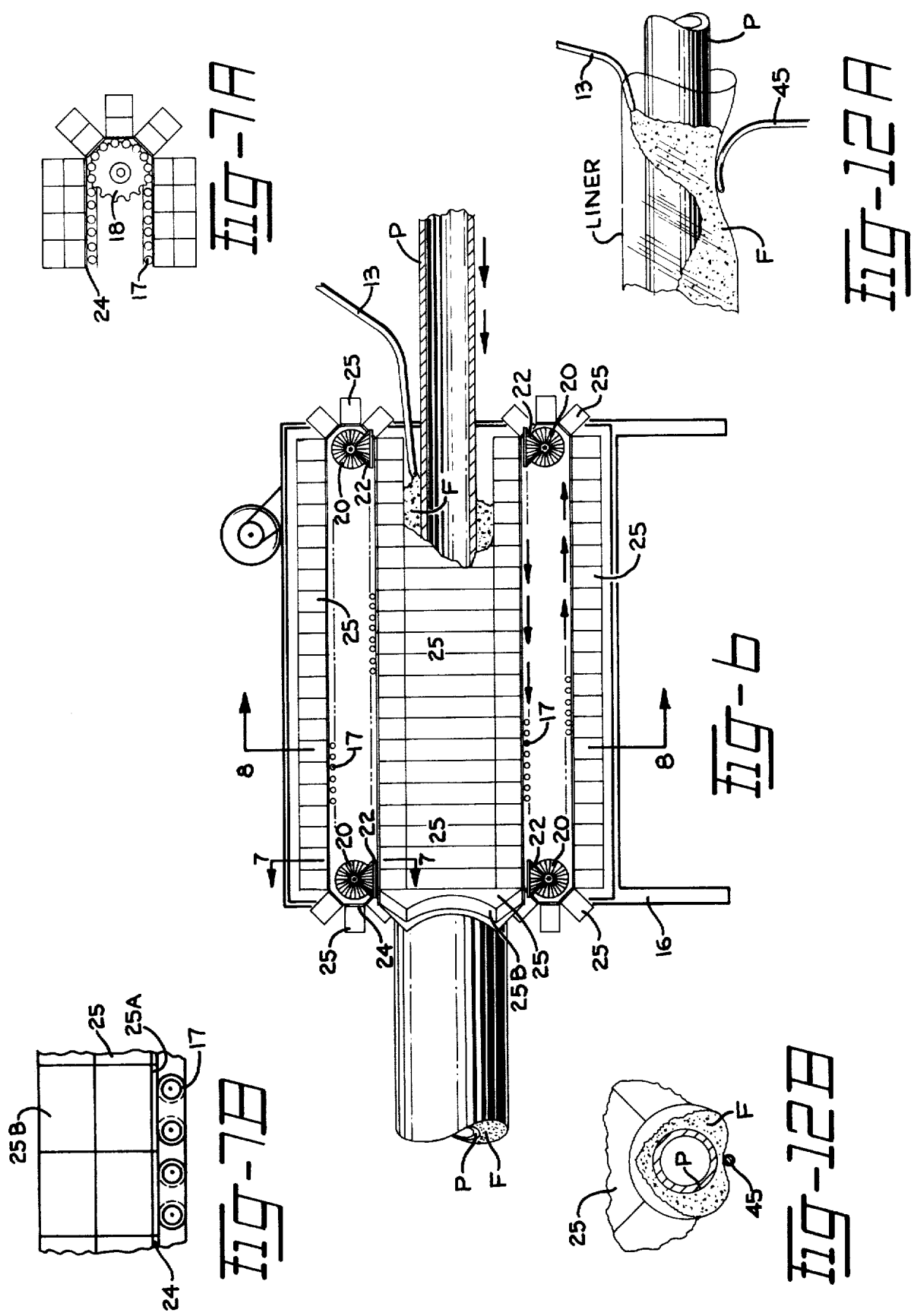

PIPE INSULATING SYSTEM AND APPARATUS THEREFOR

This invention relates to a system for handling and insulating pipe with a foamed material, such as polyurethane, and in one of its aspects to apparatus for handling the pipe during the foaming operation. In another aspect it relates to a traveling mold assembly for use in such a system to permit the foaming of the insulation about the pipe.

The forming of insulated pipe by applying a layer of polyurethane foam about the pipe is well known and a number of different machines and methods are available for accomplishing this. For example, in U.S. Pat. No. 3,233,571 a film folding device is disclosed which has been used commercially to provide a film covering spaced about the pipe into which the foam is injected. In use of these types of machines, pipe is continuously moved through the foaming apparatus and when it emerges from the apparatus, with the pipe moving at a reasonable speed, the foam is generally in a soft or gel state prior to setting. In this state it is very difficult to handle the pipe without deforming or damaging the foamed insulation which is undesirable since properly insulated pipe requires a uniform and consistent layer of insulating material about it.

It is thus an object of this invention to provide a pipe insulating and handling system for insulating pipe with a layer of foamed material in which pipe may be handled prior to setting of the foam with little or no damage to the foamed insulating layer.

Another object of this invention is to provide various forms of relatively inexpensive and simple support mechanisms for so handling the pipe in such a system.

Also, in insulating pipe with foam, such as polyurethane foam, a more uniform and consistent foam layer is generally obtained when the individual length of pipe being insulated is individually molded by a rigid, stationary mold. However, since many miles of pipe may be insulated at any one job, this method is too slow and time consuming, and requires too much handling of the pipe. Thus, methods such as described with reference to U.S. Pat. No. 3,223,571, were devised in which the pipe is moved through the foaming apparatus which permits the foam to be injected and set up about the pipe as the pipe is moving. However, such a machine requires that a continuous and permanent film of plastic be placed about the pipe and in many cases this is not necessary or desirable since the plastic film has essentially served its purpose when the foamed material is set. Thus, this method adds additional expense to the operation. Also, while the plastic film does hold the soft, injected foaming agent about the pipe prior to setting, it does not form a rigid mold and may sag due to the weight of the foam, and thus does not provide the uniform layer of foam that is provided by a stationary, rigid mold. Furthermore, when the foaming agents are applied it is generally necessary to froth or pre-expand the foam by adding, for example, freon R-12 or other frothing agents to cause the foam to properly flow around the moving pipe. This is because if spray or pour foam is used, which has better dimensionable stability, uniformity, and cell structure than froth foam, the pressure of the sprayed or poured foam against the non-rigid liner causes the foam to run to the bottom.

It is thus another object of this invention to provide the pipe insulating and handling system previously discussed and in which the insulation may be molded about the pipe as it travels by a rigid mold.

Another object of this invention is to provide a traveling mold for use in such a system which does not require the permanent application of a liner about the pipe, but in which such a liner can be used, if desired.

Another object is to provide such a system having a traveling mold in which, when used in conjunction with a flexible liner, means is provided for better distributing the foam about the pipe than in previous systems using such a liner.

Another object of this invention is to provide such a traveling mold that may be readily adapted to form foamed insulating sections of various shapes.

Another object of this invention is to provide such a traveling mold which permits the pipe passing through it to be insulated with spray foam, pour foam, etc., as well as froth foam.

These and other objects of this invention, which will be apparent upon consideration of the appended drawings and claims, and the following detailed description are accomplished by the preferred embodiments of this invention illustrated by providing a pipe insulating and handling system that includes a stationary traveling mold and apparatus for moving a string of pipe to be insulated from a rack through the mold. As this is done, the foaming agents of foam, such as polyurethane are injected between the walls of the mold, which are moved at substantially the rate of movement of the pipe, and the pipe. As the insulated pipe emerges from the mold, with the foam sufficiently set so that it remains intact around the pipe, but still soft and not fully set, it is moved onto a series of rollers which provide a cushion on which the pipe may ride without deforming or damaging the insulation about the pipe. In one embodiment of the rollers, which can also be used in other pipe insulating and handling systems for forming a layer of foamed material about a pipe, a very low pressure pneumatic roller is provided which provides a relatively large surface area contact with the insulated pipe to, in effect, cradle the pipe. In another embodiment rollers of soft foamed material such as polyurethane may be used to provide the referred to cradling effect.

The traveling mold provides a rigid and uniform mold for forming insulation about a moving pipe, and it is not necessary to place a permanent liner about the pipe. However, in some cases it may be desirable to line the wall of the mold during molding with an endless flexible liner of plastic, metal, paper, etc. in which film folding devices, such as shown in U.S. Pat. No. 3,223,571, referred to, are provided at each end of the mold to fold the film about the pipe as it enters the mold, and prior to injecting the foam, and then unfold the film as it leaves the mold. If a permanent film covering for the insulated pipe is desired, of course, the mold liner can be left about the pipe insulation. In either case the foam is injected between the pipe and the liner and the traveling mold forms a rigid backup for the liner. By use of such a rigid mold or backup, spray or pour foam, without a frothing agent such as freon R-12, can be used and the foam will rise and spread about the pipe to form a layer of substantially uniform thickness with good cell structure.

When the flexible film or liner is used with the traveling mold, a barrier is provided such as by a rod pressing against the bottom of the film below the point of application of the liquid foaming agents, to aid in evenly distributing the foam about the space between the pipe and the liner as it enters the mold. The barrier or rod may also be used with systems such as disclosed in U.S. Pat. No. 3,223,571, to accomplish the same function.

In the drawings, wherein preferred embodiments of this invention are illustrated and like numerals are used throughout to designate like parts, FIG. 1 is a view in elevation of the pipe insulating and handling system of this invention with a traveling mold mechanism shown schematically;

FIG. 6 is a view in elevation with a partial cutaway showing the details of the preferred form of traveling mold of the system of FIG. 1;

FIG. 7A is a cutaway view taken at 7—7 in FIG. 6;

FIG. 7B is an enlarged view of a portion of the apparatus shown in FIG. 7A;

FIG. 12 is a sectional view taken at 12—12 in FIG. 11.

Figure 1:
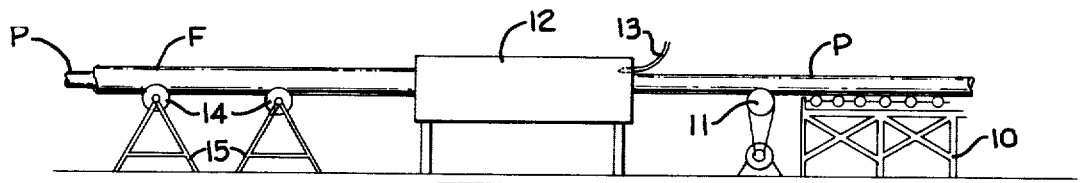

Referring now to the drawings in FIG. 1, illustrating the overall system of this invention, a pipe P is illustrated as being moved from a pipe rack 10 by a drive roller 11 connected to a drive motor M into a molding apparatus 12 in which a traveling mold, as hereinafter described in detail, is provided spaced about pipe P, with pipe P in the center of the mold. Foaming agents for polyurethane foam, or other foam to be used, which may be pre-mixed or mixed in the nozzle are injected from a nozzle 13 into the annular space between the mold of apparatus 12 and pipe P, and pipe P emerges from molding apparatus 12 with a layer of foam F of substantially uniform thickness about it.

As pipe P emerges from molding apparatus 12, the foam layer F will generally not be fully set, depending on the length of apparatus 12, the speed of movement of pipe P through apparatus 12, and the set-up time of the foam used. In this state the layer of foam F will be soft and easily deformed if not handled with extreme care. In order to facilitate handling of the foamed pipe P as it emerges from apparatus 12 and prevent damage or permanent deformation of the foam layer, the system of FIG. 1 includes means for cradling the pipe such as soft rollers 14 on stands 15 which cradle and support the soft foamed pipe until it has travelled far enough from apparatus 12, so that the foam is sufficiently set to be relatively rigid. For example, in one application with the first such roller placed about 15 feet from the point of application of the foam to the pipe, 15 of these rollers were equally spaced along the path of the pipe for about 90 feet. In this application 6-inch diameter pipe was insulated with a 1½ inch layer of foam about it which had a initiation time of about 20 seconds.

Figure 2:
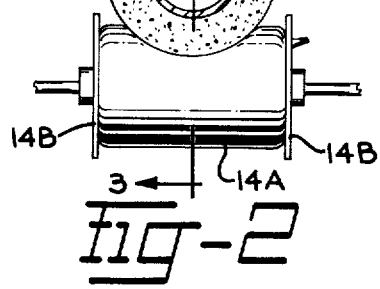
FIG. 2 is a side view in elevation of one form of foamed pipe support rollers of the system of FIG. 1.
Figure 3:
FIG. 3 is a section view taken at 3—3 in FIG. 2.

FIGS. 2 and 3 illustrate one form of rollers 14 which have been successfully used in the application described. Rollers 14 of this embodiment are made of soft rubber, or elastomer air filled tubes inflated to about 6 pounds of pressure per square inch with air, the tubes being such that they are shaped by being inflated, and in the embodiment illustrated the elastomer is not reinforced. The tube includes a soft flexible center portion 14A of soft, live rubber and end hubs 14B on which a shaft passing through the tube is mounted. Suitable tubes for this purpose with 6-inch pipe having a 1½ inch layer of foam about it may be 18 inches wide and 12 inches in diameter. Also, flexible elastomer such as neoprene or butyl having a durometer of about 40–50 has been found to be suitable for tubes 14.

It is important that area 14A of tubes 14 be soft and pliable so that pipe P and foam layer F is cradled and supported as shown in FIG. 2 with a substantial portion of the outer surface of layer F in contact with soft, pliable section 14A of roller 14, to distribute the load bearing areas of foam layer F over as large of an area as possible. For example, in a pipe insulating operation in which rollers such as shown in FIGS. 2 and 3 were used to support 6-inch pipe insulated with a layer of polyurethane foam 1½ inches thick, about 33% of the circumference of the foam layer was in contact with the tires at all time. It is preferred that the cradling effect of the tubes 14 be such that from about 20% to about 50% of the surface area of the outer surface about the circumference of layer F be in contact with the surface 14A of tubes 14 with the 33% figure generally being sufficient to prevent any substantial deformation of layer F. Of course, it is critical that the rollers 14 closer to the molding apparatus 12 provide the most cradling effect. Particularly with the closer rollers there will be some slight deformation of the foam layer as it passes over the roller, but the layer will generally shape itself.

Figure 4:
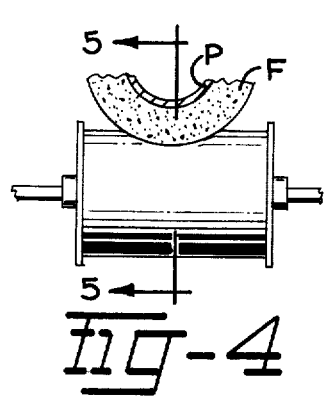
FIG. 4 is a side view in elevation of another form of foamed pipe support roller of this invention.
Figure 5:
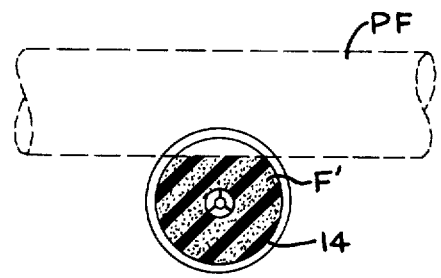
FIG. 5 is a sectional view taken at 5—5 in FIG. 4.

FIGS. 4 and 5 show an alternate arrangement of rollers 14 which has also been successfully used to support pipe with the foam in a jell or soft state without deformation of the insulation about the pipe.

In this embodiment rollers 14 are made of soft flexible foam such as polyurethane flexible foam F' (as opposed to rigid foam) and in actual use with an insulating foam layer of 1½ inches thickness about a 6-inch pipe, with the foam F' density less than 6 pounds per cubic foot, so that at least 20% of the surface area of the circumference of the layer of foam F of the pipe was in contact with the foam filled roller to provide the desired cradling effect and distribute the load on the foam layer F. The foam F' density should be as low as possible with the weight of pipe used so that the foam F' gives, but is not compressed so much against the axles of the wheel that the flexible foam is no longer effectively flexible. Also, rollers 14 of FIGS. 4 and 5 can be made by filling the concave portion of hourglass rollers with flexible foam F'.

Figure 8:
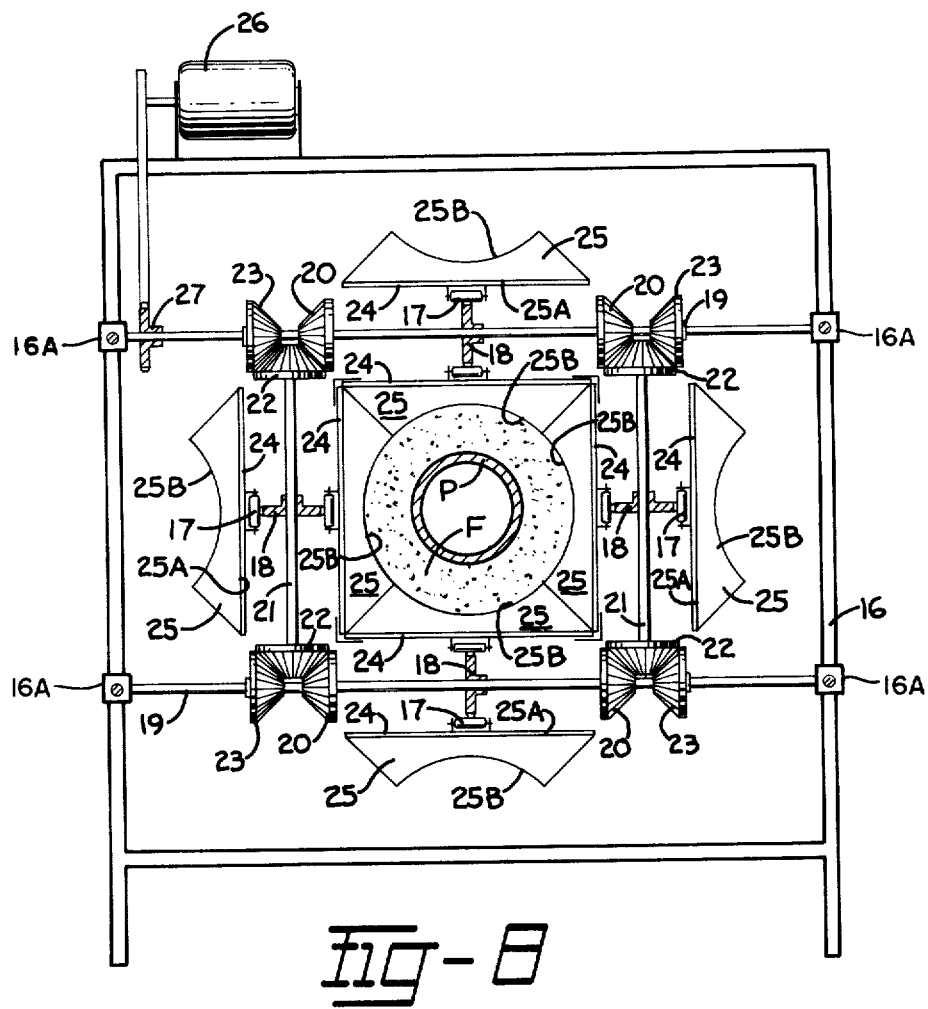
FIG. 8 is a sectional view taken at 8—8 in FIG. 6.

FIGS. 6–9 illustrate a preferred form of traveling mold for molding apparatus 12 which permits the foam layer F to be molded about pipe P. For purposes of simplicity, apparatus 12 is shown without a portion of its support frame 16 shown. Molding apparatus 12 includes four endless chains 17 each wrapped about a chain sprocket 18 at each end of apparatus 12 so that eight such sprockets are provided, four being located at each end of the apparatus. As the chains move around their sprockets a portion will be outward from the mold and between its respective sprockets and the outward portion will move around the sprocket and then be inward towards the mold and between its respective sprockets. Of course, other means such as endless tracks could be provided for this purpose, and more or less than four chains could be used, as long as some means is provided for moving the sections of the mold along the pipe from a first position to a second position and returning these sections to the first position where they can again move along the pipe to the second position. The chains and sprockets are supported by frame 16 through horizontal extending axles 19 which are spaced apart and parallel to each other, as better shown in FIG. 8, the axles being rotatably mounted on frame 16 such as on bearings (not shown) in end connectors 16A of frame 16. Of course, other suitable ways may be provided for supporting the mold formed by apparatus 12 so that a pipe to be insulated can pass through it. Each axle 19 includes spaced apart 45° angle bevel gears 20 mounted on it, each at effectively the corner of a square, and spaced apart vertical extending axles 21 are also provided with 45° angle bevel gears 22 at their ends to mesh with gears 20. A second set of 45° bevel gears 23 may be provided on axles 19 to also mesh with gears 22 to prevent lateral displacement of axles 21, however, these gears would have to be free to rotate with respect to axles 19. Each chain 17 has a plurality of flat slats 24 secured to it with each slat having a width substantially equal to one side of a four sided mold as shown in FIG. 8. A molding section 25 including a flat surface 25A and a curved surface 25B (each such surface having the same radii of curvature and extending on an arc of about 90°) are provided on each slat 24, with flat surface 25A mounted flush on flat slat 24. In this manner curved surface 25B faces outward from the mold as it moves along its respective chain 17 when that portion of the chain to which it is secured is outward from the mold, and then curved surface 25B will move around the chain sprocket to be facing inward as shown in FIG. 8. A like number of molding sections 25 of equal size and spacing are provided as each of chains 17 and the respective chains are driven in unison through the bevel gearing by a motor 26 and pulley 27. The ends of each of molding sections 25 are also beveled on a 45° angle so that when the sections positioned at the same position along each of the chains 17 move around sprocket 18 to face inwardly, their flat (now outer) surfaces 25A form a square and their curved (now facing inward) surfaces form a circle which moves along the chains 17 until the four molding sections move around the sprocket at the other end of the mold. This sequence is repeated with each set of four molding sections 25 mounted at the same position along the length of their respective chains so that a continuous circular mold is formed by the curved surfaces 25B. Molding sections 25 can be sized so that the continuous circular mold formed provides an annulus about a pipe P on which polyurethane foam can be injected to be molded. Also, the movement of the mold sections 25 along chains 17 can be synchronized with the movement of pipe P through the mold so that there is virtually no relative movement of the walls of the mold (formed by surfaces 25B) and the outer wall of pipe P. Thus, the advantages provided by a fixed, rigid, mold can be provided. For example, it is possible with this arrangement for the foam to set up with a consistent and uniform layer F about the pipe.

Figure 9:
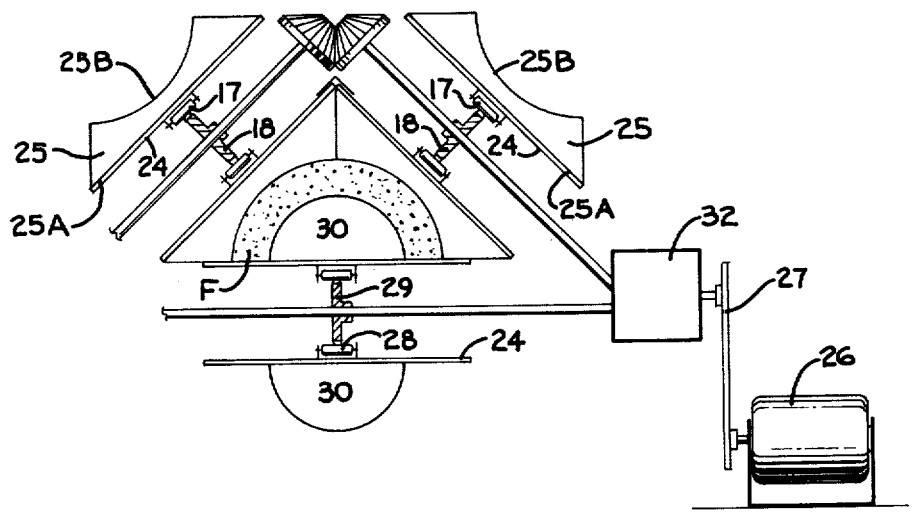
FIG. 9 is an end view of a modified form of the traveling mold of FIG. 8 for molding semi-circular half sections of foamed insulation.

FIG. 9 illustrates another form of the traveling mold of this invention which may be used to mold rigid half sections of foamed material which then can be applied to pipe. In this case two of the chains 17 and their molding sections are dispensed with and replaced by a single chain 28 strung about two sprockets 29 (only one being shown in FIG. 9) located at about 135° from chains 17 and sprockets 18. Slats 24 are also mounted on chain 28, and a semi-circular molding section 30 is mounted on each of slats 24 on chain 28 so that at the same position along the length of chains 17 and 28, two molding sections 25 and one molding section 30 are provided which move along the chains in unison, and move from a position where their curved surfaces face outward from the mold and away from each other to a position where these curved surfaces face inwardly of the mold and towards each other. In the latter case, a curved annulus 31 having its inner wall formed by the curved surface of molding section 30 and its curved outer wall formed by the curved surfaces 25B of molding sections 25 is provided in which foam F can be injected to form a foamed half tubular section of insulation which can be later applied to a pipe. The respective sections 25 and 30 along chains 17 and 28 again form a continuous traveling rigid mold so that there is no relative movement of the walls of the mold with respect to each other. For this purpose, the chains 17 and 28 of the FIG. 9 embodiment can be driven in unison through suitable gearing 32 provided for a 45° connection by a common motor 26.

Figure 10:
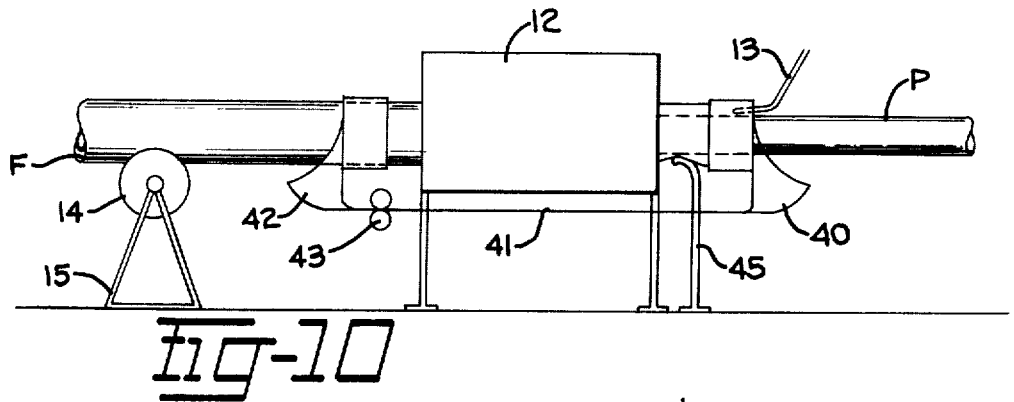
FIG. 10 is a view in elevation of the system of FIG. 1 provided with a means for folding and unfolding an endless plastic liner about the pipe.

In some instances, depending on the viscosity and tackiness of the foaming agents, it may be desirable to line the inward facing surfaces 25B of the mold with a thin plastic liner which will keep the foaming agents from running between the separate molding sections and help to separate the foam layer formed from the mold. Although it is desired that the adjacent molding sections be placed as close together as possible to keep the foaming agents from running between the sections, such care in manufacturing the molding apparatus can also greatly increase its cost. Thus, FIG. 10 shows a form of molding apparatus 12 which includes a film folding device 40 at one end for folding a flat sheet of plastic liner 41 into a circular shape about pipe P and against molding surfaces 25B, and a second film folder 42 at the other end of molding apparatus 12 which unfolds the circular sheet as it emerges from apparatus 12 to form flat sheet again which then moves back to folder 40. Means such as rollers 43 may be provided for moving film 41 and these rollers can be driven in unison with the traveling mold sections and pipe P so that again there is little or no relative movement between the pipe and the walls of the mold.

Figure 11:
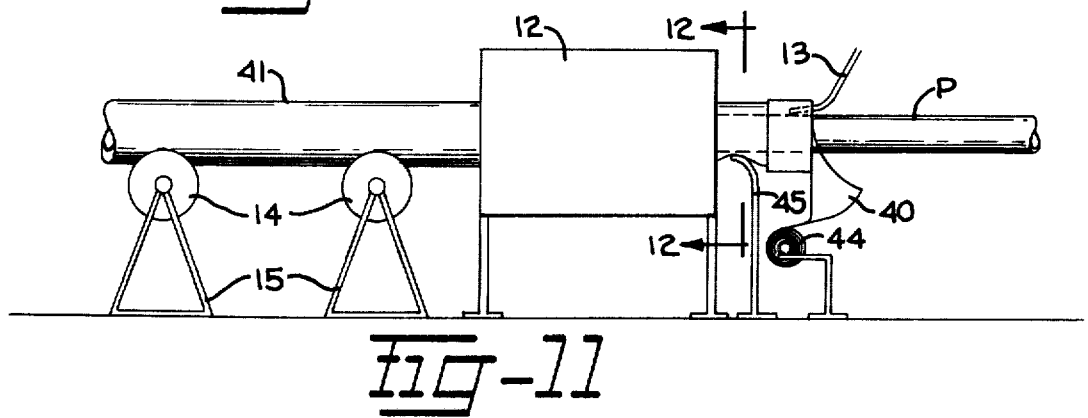
FIG. 11 is a view in elevation of the system of FIG. 1 with means for applying a permanent plastic liner about the insulated pipe.

Should it be desirable to leave the plastic film about the layer F on pipe P, for example, where the pipe is to be used in a particularly corrosive environment, then the film folder 42 can be dispensed with all the film supply taken from a roller 44, as shown in FIG. 11.

In either the FIG. 10 or 11 embodiments of this invention, foam is injected by nozzle 13 into the annular space between pipe P and circular film 41. If this is done any appreciable distance in front of molding apparatus 12 it may be desirable to place a small barrier or dam 45 against the outside bottom of film 41 just below (or adjacent to just below) the place where the foam is injected by nozzle 13. As shown in FIGS. 12A and 12B barrier 45, which in the embodiment shown is provided by a curved rod bearing against the outside bottom of film 41, causes the free flowing foam to back up and spread moving evenly about the annulus between the pipe and plastic liner, from approximately a point just below the point of application of the foam for a short distance along the pipe. For example, in the pipe and insulation size of the previous examples (6-inch pipe with 1½-inch layer of foam), rod 45 may extend about 6 inches along the pipe from its curved portion to its end. Without this barrier, with the flexible liner 41, it has been found that it is very difficult to control the amount of foam that flows around each side of the pipe from the nozzle to the bottom of the pipe and the foam will tend to overlap in layers, form stress cracks, and the cell structure of the foam is degraded as the foam moves along the bottom of the film liner. With the barrier 45 these effects were greatly reduced. Of course, barrier 45 may take many different forms which serve to impede the foam flowing from the nozzle around one side of the pipe from flowing to the other side of the pipe until the foam has traveled a short distance generally a matter of inches from its point of application. Of course, the barrier may also be used with other molding systems using a flexible liner to provide the same advantage, and, in fact, has been used successfully with a system utilizing the film folder of U.S. Pat. No. 3,223,571.

The folding apparatus 40 and 42 are known in the art and may take several different forms, for example, the folding apparatus shown in U.S. Pat. No. 3,223,571, would be suitable.

Thus, a pipe handling and insulating system has been described in which pipe may be molded with a layer of foam, such as polyurethane, as it is moved from a rack. The present system has the advantages of the prior art fixed mold systems and prior art moving pipe insulating systems. Also, the pipe can be handled with less chance of damage to the foamed insulating layer formed.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe insulating and handling system for insulating pipe with a foamed insulation comprising, in combination: molding apparatus adapted to form an annulus about a pipe to be insulated into which foam can be injected; means for moving a pipe to be insulated through the molding apparatus; means for injecting a foaming material into said annulus; and support means adjacent the molding apparatus and adapted to support insulated pipe emerging from the molding apparatus, said support means including at least one roller formed off a soft flexible material and adapted to cradle at least about 20% of the circumference of the insulated pipe and support it without substantial deformation of the insulating foam layer prior to setting of the foam.

2. The system of claim 1 wherein said support means includes at least one roller formed by a relatively low pressure pneumatic tire.

3. The system of claim 1 wherein said support means includes at least one roller formed by a layer of flexible foam.

4. The system of claim 1 wherein said molding apparatus includes a traveling mold having a plurality of molding sections adapted to form a rigid mold about a pipe to be insulated, and further including means for moving said molding sections along the pipe as it passes through said molding apparatus at substantially the same rate of movement as the pipe is moving through the molding apparatus.

5. The system of claim 4, wherein each of said molding sections has a flat surface and a curved surface and are mounted on one of four endless members located at about 90° positions about said molding apparatus and along the length of said apparatus so that each of said molding sections moves along its respective endless member from a position where its curved surface is facing away from a pipe about which foam is to be molded, to a position along the pipe where its curved surface is facing such a pipe, so that adjacent such molding sections form a circular moving mold about the pipe.

6. The system of claim 5 further including means for driving each of said endless members in unison.

7. The system of claim 4 wherein said molding apparatus includes film folding apparatus for providing a flexible liner encircling the pipe to be insulated to provide a jacket about the pipe being insulated.

8. The system of claim 7 further including a second film folding apparatus for refolding the flexible liner formed as it emerges from the molding apparatus whereby an endless mold liner may be provided.

9. The apparatus of claim 7 further including barrier means urged against the lower portion of said liner adjacent a point below where the foam agents are injected.

10. The system of claim 1 wherein about 33% of the circumference of the foaming material about the pipe is in substantial contact with said roller.

11. The system of claim 2 wherein said pneumatic tire is formed of a flexible elastomer having a durometer of about 40–50.

12. The system of claim 3 wherein said flexible foam is polyurethane.

13. The system of claim 12 wherein said polyurethane has a density less than about 6 pounds per cubic foot, but is of sufficient density to be effectively flexible.

14. A pipe insulating and handling system for insulating pipe with a foamed insulation comprising, in combination: molding apparatus adapted to form an annulus about a pipe to be insulated into which foam can be injected; means for moving a pipe to be insulated through the molding apparatus; means for injecting a foaming material into said annulus; said support means adjacent the molding apparatus and adapted to support insulated pipe emerging from the molding apparatus, said support means adapted to cradle the insulated pipe and support it without substantial deformation of the insulating foam layer prior to setting of the foam, said support means including at least one roller formed by a layer of flexible polyurethane foam.

15. The system of claim 14 wherein said polyurethane foam has a density of not greater than substantially 6 pounds per cubic foot.

16. The system of claim 14 wherein said roller is adapted to contact at least about 20% of the circumferential surface area of said insulated pipe.

17. The system of claim 16 including a plurality of such rollers.

18. A pipe insulating and handling system for insulating pipe with a foamed insulation comprising, in combination: molding apparatus adapted to form an annulus about a pipe to be insulated into which foam can be injected; means for moving a pipe to be insulated through the molding apparatus; means for injecting a foaming material into said annulus; and support means adjacent the molding apparatus and adapted to support insulated pipe emerging from the molding apparatus, said support means adapted to cradle the insulated pipe and support it without substantial deformation of the insulating foam layer prior to setting of the foam, said support means including at least one roller formed by a relatively low pressure pneumatic tire made of a relatively soft elastomer.

19. The system of claim 18 wherein said roller is adapted to contact at least about 20% of the circumferential surface area of said insulated pipe.

20. The system of claim 16 including a plurality of said rollers.

* * * * *